United States Patent
Wenner

(10) Patent No.: US 7,748,159 B1
(45) Date of Patent: Jul. 6, 2010

(54) DEVICE FOR TRAPPING FLIES

(76) Inventor: Carl F. Wenner, 6379 St. Hwy. 28, Fly Creek, NY (US) 13337

( * ) Notice: Subject to any disclaimer, the term of this patent is extended or adjusted under 35 U.S.C. 154(b) by 134 days.

(21) Appl. No.: 12/077,210

(22) Filed: Mar. 17, 2008

(51) Int. Cl.
*A01M 1/24* (2006.01)
*A01M 1/14* (2006.01)

(52) U.S. Cl. .............................. 43/119; 43/114; 43/115

(58) Field of Classification Search .................. 43/114, 43/115, 119
See application file for complete search history.

(56) References Cited

U.S. PATENT DOCUMENTS

| | | | | |
|---|---|---|---|---|
| 395,640 A * | 1/1889 | Thum | ........................... | 43/114 |
| 418,803 A * | 1/1890 | Medford | ........................ | 43/115 |
| 485,815 A * | 11/1892 | Koecher | ....................... | 43/114 |
| 486,138 A * | 11/1892 | Thum | ........................... | 43/114 |
| 520,715 A * | 5/1894 | Thum | ........................... | 43/114 |
| 528,573 A * | 11/1894 | Thum | ........................... | 43/115 |
| 532,454 A * | 1/1895 | Farnam | ......................... | 43/115 |
| 544,295 A * | 8/1895 | Farnam | ......................... | 43/115 |
| 560,040 A * | 5/1896 | Maynadier | .................... | 43/114 |
| 740,076 A * | 9/1903 | Baker | ............................ | 43/114 |
| 762,839 A * | 6/1904 | Nostrand et al. | .............. | 43/115 |
| 800,354 A * | 9/1905 | Boyd | ............................ | 43/114 |
| 809,951 A * | 1/1906 | Hixson | ......................... | 43/115 |
| 825,275 A * | 7/1906 | Laube et al. | .................. | 43/115 |
| 828,128 A * | 8/1906 | Laube et al. | .................. | 43/115 |
| 884,487 A * | 4/1908 | Hackley | ........................ | 43/119 |
| 906,646 A * | 12/1908 | Monell | ......................... | 43/115 |
| 944,880 A * | 12/1909 | Laube | ........................... | 43/115 |
| 944,881 A * | 12/1909 | Laube | ........................... | 43/115 |
| 944,994 A * | 12/1909 | Laube | ........................... | 43/115 |
| 945,003 A * | 12/1909 | Laube | ........................... | 43/115 |
| 948,863 A * | 2/1910 | Laube | ........................... | 43/115 |
| 993,887 A * | 5/1911 | Schroeder | .................... | 43/119 |
| 998,449 A * | 7/1911 | Baker | ........................... | 43/119 |
| 1,015,141 A * | 1/1912 | Crandall | ...................... | 43/119 |
| 1,071,578 A * | 8/1913 | Rese | ............................. | 43/114 |
| 1,072,374 A * | 9/1913 | Acree | .......................... | 43/119 |
| 1,080,822 A * | 12/1913 | Foster | ......................... | 43/115 |
| 1,087,058 A * | 2/1914 | Zielfeldt | ....................... | 43/114 |
| 1,099,461 A * | 6/1914 | McMenamin | ................ | 43/115 |
| 1,112,064 A * | 9/1914 | Gordon | ........................ | 43/114 |
| 1,187,969 A * | 6/1916 | Clifford | ........................ | 43/115 |
| 1,239,148 A * | 9/1917 | Wende | ......................... | 43/114 |
| 1,293,067 A * | 2/1919 | Faulkner | ...................... | 43/115 |
| 1,373,650 A * | 4/1921 | Carlson | ........................ | 43/119 |
| 1,560,683 A * | 11/1925 | Foley | ........................... | 43/115 |
| 1,715,173 A * | 5/1929 | Opitz | ........................... | 43/121 |

(Continued)

FOREIGN PATENT DOCUMENTS

DE           3810065 C1 *   4/1989

(Continued)

*Primary Examiner*—Darren W Ark
(74) *Attorney, Agent, or Firm*—Richard L. Miller

(57) ABSTRACT

A device for trapping flies which comprises an elongated housing. A mechanism is for mounting the housing horizontally on an inside lower portion of a window pane adjacent to a window sill. Another mechanism for holding flies is carried within said housing. The flies, when attracted to light coming through the window pane, will hit the window pane and drop down to stick to the holding mechanism. A cover on the housing is to conceal the flies stuck to the holding mechanism.

3 Claims, 1 Drawing Sheet

U.S. PATENT DOCUMENTS

| | | | | |
|---|---|---|---|---|
| 1,749,717 | A | * | 3/1930 | Palmos ........................ 43/119 |
| 1,802,774 | A | * | 4/1931 | Nixon ......................... 43/115 |
| 1,951,289 | A | * | 3/1934 | Menze et al. ................. 43/119 |
| 2,328,590 | A | * | 9/1943 | Weil ............................ 43/131 |
| 2,808,679 | A | * | 10/1957 | Collins ........................ 43/131 |
| 2,911,756 | A | * | 11/1959 | Geary ........................ 43/114 |
| 2,962,836 | A | * | 12/1960 | Hughes ..................... 43/114 |
| 3,449,856 | A | * | 6/1969 | Weaver ...................... 43/115 |
| 3,913,259 | A | * | 10/1975 | Nishimura et al. ........... 43/114 |
| 3,968,590 | A | * | 7/1976 | Kitterman ................... 43/114 |
| 4,031,654 | A | * | 6/1977 | Gray .......................... 43/114 |
| 4,117,624 | A | * | 10/1978 | Phillips ....................... 43/113 |
| 4,161,079 | A | * | 7/1979 | Hill ............................ 43/114 |
| 4,208,828 | A | * | 6/1980 | Hall et al. .................... 43/114 |
| 4,217,722 | A | * | 8/1980 | McMullen ................... 43/114 |
| 4,244,134 | A | * | 1/1981 | Otterson ..................... 43/114 |
| 4,349,981 | A | * | 9/1982 | Sherman ..................... 43/114 |
| 4,395,842 | A | * | 8/1983 | Margulies ................... 43/114 |
| 4,411,093 | A | * | 10/1983 | Stout et al. ................... 43/114 |
| 4,425,731 | A | * | 1/1984 | Orlando ...................... 43/114 |
| 4,599,822 | A | * | 7/1986 | Baker ......................... 43/114 |
| 4,709,503 | A | * | 12/1987 | McQueen ................... 43/114 |
| 4,709,504 | A | * | 12/1987 | Andric ....................... 43/114 |
| 4,815,231 | A | * | 3/1989 | McQueen ................... 43/114 |
| 4,819,371 | A | * | 4/1989 | Cohen ........................ 43/114 |
| 4,829,702 | A | * | 5/1989 | Silvandersson .............. 43/114 |
| 4,876,823 | A | * | 10/1989 | Brunetti ...................... 43/114 |
| 4,908,976 | A | * | 3/1990 | Dagenais .................... 43/115 |
| 5,022,179 | A | * | 6/1991 | Olson ......................... 43/114 |
| 5,031,354 | A | * | 7/1991 | Olson ......................... 43/114 |
| 5,142,815 | A | * | 9/1992 | Birdsong .................... 43/114 |
| 5,155,950 | A | * | 10/1992 | Burgeson .................... 43/114 |
| 5,239,771 | A | * | 8/1993 | Beardsley ................... 43/119 |
| 5,384,981 | A | * | 1/1995 | Cohen ........................ 43/114 |
| 5,394,640 | A | * | 3/1995 | Musket ....................... 43/114 |
| 5,396,729 | A | * | 3/1995 | Vejvoda ..................... 43/114 |
| 5,398,442 | A | * | 3/1995 | Musket ....................... 43/114 |
| 5,454,186 | A | * | 10/1995 | Gang .......................... 43/114 |
| 5,477,636 | A | * | 12/1995 | Musket ....................... 43/114 |
| 5,531,043 | A | * | 7/1996 | Shiboh ....................... 43/121 |
| 5,572,825 | A | * | 11/1996 | Gehret ........................ 43/114 |
| 5,588,250 | A | * | 12/1996 | Chiba et al. .................. 43/114 |
| 5,608,988 | A | * | 3/1997 | Dowling et al. .............. 43/114 |
| 5,634,293 | A | * | 6/1997 | Mike et al. ................... 43/114 |
| 5,649,385 | A | * | 7/1997 | Acevedo ..................... 43/114 |
| 5,815,981 | A | * | 10/1998 | Dowling et al. .............. 43/114 |
| 5,930,944 | A | * | 8/1999 | Knuppel ..................... 43/114 |
| 6,185,862 | B1 | * | 2/2001 | Nelson ........................ 43/136 |
| 6,463,693 | B1 | * | 10/2002 | Weisner ...................... 43/119 |
| 6,560,919 | B2 | * | 5/2003 | Burrows et al. .............. 43/114 |
| 6,574,914 | B2 | * | 6/2003 | Smith ......................... 43/114 |
| 6,651,379 | B1 | * | 11/2003 | Nelson ........................ 43/114 |
| 6,655,078 | B2 | * | 12/2003 | Winner et al. ................ 43/114 |
| 6,920,716 | B2 | * | 7/2005 | Kollars et al. ................ 43/114 |
| 7,191,560 | B2 | * | 3/2007 | Harris ......................... 43/114 |
| 7,380,369 | B1 | * | 6/2008 | Greene et al. ................ 43/119 |
| 7,469,501 | B1 | * | 12/2008 | Blum .......................... 43/136 |
| 2002/0124457 | A1 | * | 9/2002 | Cosenza ...................... 43/114 |
| 2003/0079398 | A1 | * | 5/2003 | Holmes ....................... 43/113 |
| 2004/0020104 | A1 | * | 2/2004 | Feldhege et al. .............. 43/114 |
| 2004/0200130 | A1 | * | 10/2004 | Klein .......................... 43/114 |
| 2006/0032112 | A1 | * | 2/2006 | George et al. ................ 43/114 |
| 2006/0048442 | A1 | * | 3/2006 | Leming ....................... 43/119 |
| 2006/0185224 | A1 | * | 8/2006 | Klein .......................... 43/114 |
| 2007/0068066 | A1 | * | 3/2007 | Reatti ......................... 43/114 |
| 2007/0169402 | A1 | * | 7/2007 | Jacobson ..................... 43/114 |

FOREIGN PATENT DOCUMENTS

| | | | |
|---|---|---|---|
| EP | 1198988 | A1 * | 4/2002 |
| EP | 1832166 | A2 * | 9/2007 |
| JP | 08033444 | A * | 2/1996 |
| JP | 10191860 | A * | 7/1998 |
| JP | 10276648 | A * | 10/1998 |
| JP | 2002300837 | A * | 10/2002 |
| JP | 2002306044 | A * | 10/2002 |
| JP | 2003092964 | A * | 4/2003 |
| JP | 2004105058 | A * | 4/2004 |
| WO | WO 9707673 | A1 * | 3/1997 |
| WO | WO 03075651 | A1 * | 9/2003 |

* cited by examiner

DEVICE FOR TRAPPING FLIES

BACKGROUND OF THE INVENTION

1. Field of the Invention

The present invention relates to an insect catcher, and more particularly, a device for trapping flies.

2. Description of the Prior Art

Numerous innovations for flying insect traps have been provided in the prior art that will be described. Even though these innovations may be suitable for the specific individual purposes to which they address, however, they differ from the present invention.

A FIRST EXAMPLE, U.S. Patent Office Document No. 560,040, Issued on May 12, 1896, to Maynadier teaches a fly catcher which comprises in combination with a partially darkened window, a sheet of glass or other transparent material treated with a sticky substance which is placed against a portion of the window through which light is admitted, and with the sticky side toward a room to which the window gives light, substantially as specified.

A SECOND EXAMPLE, U.S. Patent Office Document No. 4,829,702, Issued on May 16, 1989, to Silvandersson teaches an insect trap containing a frame provided with an insect-holding adhesive substance and capable of being placed in a desired position. The trap allows insects to be trapped effectively. The frame is transparent, at least to a certain degree, and exhibits a part which permits the installation of the trap in a desired position, for example, in a window on its glass.

A THIRD EXAMPLE, U.S. Patent Office Document No. 5,022,179, Issued on 06-11-1991, to Olson teaches an insect trapping device for mounting on a support surface, such as a window, includes an elongate, substantially flat body divided into first, second and third sections which can be folded so that the first section, which carries a surface adhering element such as pressure sensitive adhesive, can be secured to the window with the second section projecting normally to the plane of the window and carrying a quantity of insect trapping adhesive and with the third section projecting upwardly from the second section so as to screen off the second section and any insects trapped therein.

A FOURTH EXAMPLE, U.S. Patent Office Document No. 5,608,988, Issued on Mar. 11, 1997, to Dowling et al. teaches a method and associated apparatus for trapping flies; with the method involving the following steps. Firstly, provide a tube which has an adhesive layer. Secondly, place the tube on a window sill with the adhesive layer positioned immediately adjacent to an interior surface of a pane of glass. A fly bouncing off the interior surface of the pane of glass adjacent the sill comes in contact with the adhesive layer and is held securely to the tube.

A FIFTH EXAMPLE, U.S. Patent Office Document No. 5,815,981, Issued on 10-06-1998, to Dowling et al. teaches a fly trap that includes a tubular body which is triangular in cross-section. One exterior face is coated with a sticky fly catching substance. A flap is secured to a peripheral edge of the sticky coated exterior face. In a stored position, the flap overlies the sticky coated exterior face. In a fly catching position, the flap is pivotally spaced from the sticky coated exterior face, thereby forming a "V" shaped trough. An interior surface of the flap is also coated with a sticky fly catching substance. An exterior surface of the flap has a sticky window adhesion strip.

A SIXTH EXAMPLE, U.S. Patent Office Document No. 6,463,693, Issued on 10-15-2002, to Weisner teaches an insect trap having a receptacle with a rear wall the top edge of which is thin. The trap is placed on a windowsill so the thin top edge of the rear wall lies flush against the window, providing a substantially smooth transition between the rear wall and the window. The receptacle is partially filled with a mixture of water and surfactant. In use, insects flying down the window travel over the thin top edge of the rear wall and continue down and fall into the water and drown.

A SEVENTH EXAMPLE, U.S. Patent Office Publication No. 2004/0020104, Published on Feb. 5, 2004, to Feldhege et al. teaches a device for catching flying insects, which comprises a planar support with a first surface (top surface) and a second surface (lower surface). A layer that contains a substance that attracts insects and/or to which insects stick is provided on at least one of the surfaces. The device further comprises a fastening device by way of which it can be positioned on the application site (for example a window) during utilization in such a way that the surface coated with the substance that attracts insects and/or to which insects stick is in a substantially horizontal position.

It is apparent now that numerous innovations for flying insect traps have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a device for trapping flies that avoids the disadvantages of the prior art.

ANOTHER OBJECT of the present invention is to provide a device for trapping flies that is simple and inexpensive to manufacture.

STILL ANOTHER OBJECT of the present invention is to provide a device for trapping flies that is simple to use.

BRIEFLY STATED, STILL YET ANOTHER OBJECT of the present invention is to provide a device for trapping flies which comprises an elongated housing. A mechanism is for mounting the housing horizontally on an inside lower portion of a window pane adjacent to a window sill. Another mechanism for holding flies is carried within the housing. The flies, when attracted to light coming through the window pane, will hit the window pane and drop down to stick to the holding mechanism. A cover on the housing is to conceal the flies stuck to the holding mechanism.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
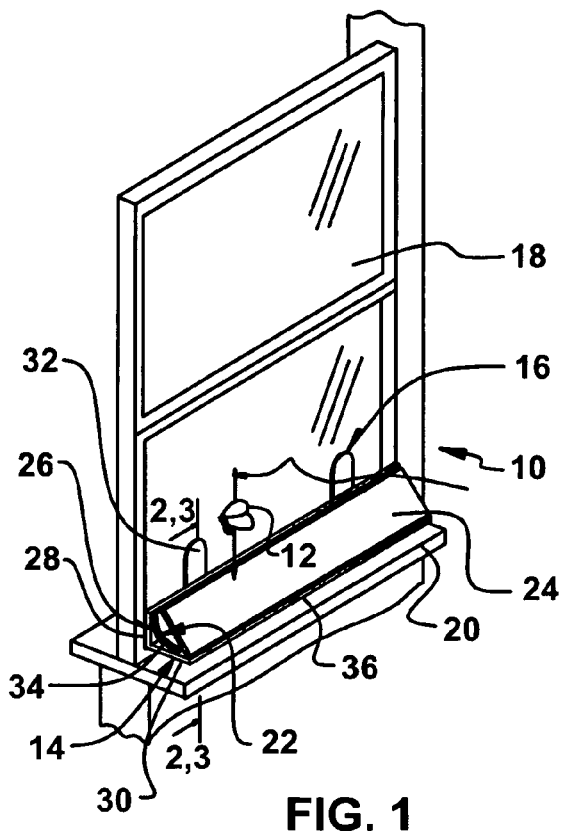
FIG. 1 is a diagrammatic perspective view showing an embodiment of the present invention in use mounted horizontally to a window pane adjacent a window sill.

A MARSHALING OF REFERENCE NUMERALS UTILIZED IN THE DRAWING 10 device
12 fly
14 elongated housing of device 10
16 mounting mechanism of device 10
18 window pane
20 window sill
22 holding mechanism of device 10
24 cover of device 10
26 L-shaped member for elongated housing 14
28 back wall of L-shaped member 26
30 bottom wall of L-shaped member 26
32 pressure sensitive adhesive pad for mounting mechanism 16
34 fly paper for holding mechanism 22
36 hinge of device 10
38 forward end of bottom wall 30
40 bottom edge of cover 24
42 top edge of cover 24
44 top end of back wall 28

DETAILED DESCRIPTION OF THE PREFERRED EMBODIMENT

Figure 2:
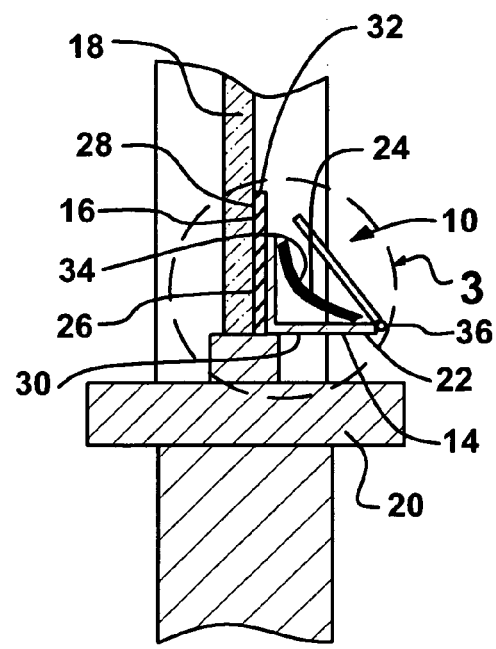
FIG. 2 is a cross sectional view taken on line 2-2 of FIG. 1.

Referring now to the figures, in which like numerals indicate like parts, and particularly to FIGS. 1 through 4, which are a diagrammatic perspective view showing an embodiment of the present invention in use mounted horizontally to a window pane adjacent a window sill; a cross sectional view taken on line 2-2 of FIG. 1; an enlarged cross sectional view taken on line 3-3 of FIG. 1 and also of the area enclosed in the dotted circle indicated by arrow 3 in FIG. 2; and an enlarged diagrammatic perspective view of the present invention per se, with parts broken away, and as such, will be discussed with reference thereto.

The present invention is a device 10 for trapping flies 12 which comprises an elongated housing 14. A mechanism 16 is for mounting the housing 14 horizontally on an inside lower portion of a window pane 18 adjacent to a window sill 20. Another mechanism 22 for holding flies 12 is carried within the housing 14. The flies 14, when attracted to light coming through the window pane 18, will hit the window pane 18 and drop down to stick to the holding mechanism 22. A cover 24 on the housing 14 is to conceal the flies 12 stuck to the holding mechanism 22.

The housing 14 comprises an L-shaped member 26 having a back wall 28 and a bottom wall 30. The mounting mechanism 16 comprises at least one pressure sensitive adhesive pad 32 located between the back wall 28 of the L-shaped member 26 and the window pane 18. The holding mechanism 22 comprises a stack of peelable concave fly paper 34 sitting between the back wall 28 and the bottom wall 30 of the L-shaped member 26.

Figure 3:
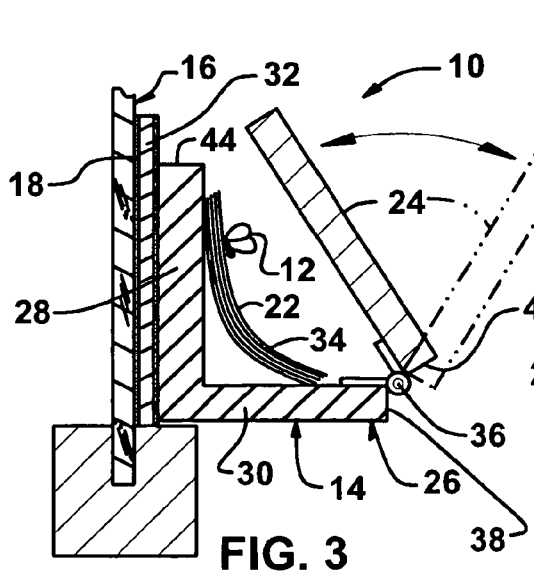
FIG. 3 is an enlarged cross sectional view taken on line 3-3 of FIG. 1 and also of the area enclosed in a dotted circle indicated by arrow 3 in FIG. 2.
Figure 4:
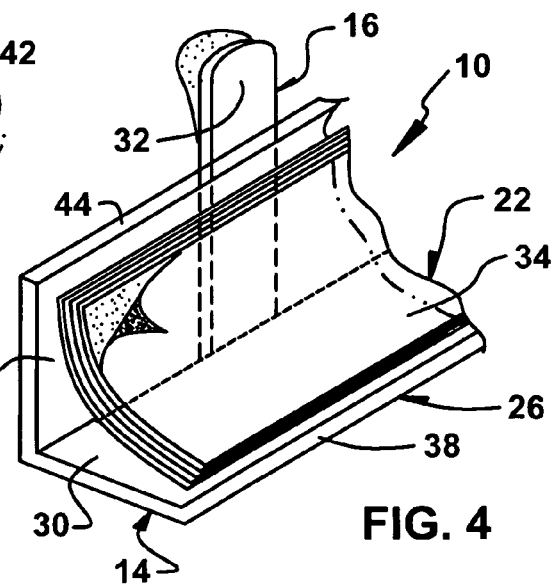
FIG. 4 is an enlarged diagrammatic perspective view of the present invention per se, with parts broken away.

The device 10, as best seen in FIG. 3, further comprises a hinge 36 located between a forward end 38 of the bottom wall 30 of the L-shaped member 26 and a bottom edge 40 of the cover 24. The hinge 36 will allow the cover 24 to pivot between a first up position and a second down position. When the cover 24 is in the first up position in a sixty degree angle with respect to the back wall 28 of the L-shaped member 26, the cover 24 will conceal the flies 12 on the fly paper 34, while a small space between a top edge 42 of the cover 24 and a top end 44 of the back wall 28 of the L-shaped member 26 will allow other flies 12 to drop down onto the fly paper 34. When the cover 24 is in the second down position the flies 12 stuck on the fly paper 34 can be checked, in which a top layer of the fly paper 34 can be removed when needed.

The L-shaped member 26 and cover 24 can be fabricated out of plastic, wood or metal and be made of various lengths to fit different size window panes 18. Two or more pressure sensitive adhesive pads 32 can be utilized depending upon the length of the L-shaped member 26. Suction cups (not shown) can be used in place the pressure sensitive adhesive pads 32.

It will be understood that each of the elements described above, or two or more together, may also find a useful application in other types of constructions differing from the types described above.

While the invention has been illustrated and described as embodiments of a device for trapping flies, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for trapping flies, which comprises:
   a) an elongated housing;
   b) means for mounting said housing horizontally on an inside lower portion of a window pane adjacent to a window sill;
   c) means for holding flies carried within said housing, wherein the flies, when attracted to light coming through the window pane, will hit the window pane and drop down to stick to said holding means;
   d) a cover on said housing to conceal the flies stuck to said holding means; wherein said housing comprises and L-shaped member having a back wall and a bottom wall; and
   e) a hinge located between a forward end of said bottom wall of said L-shaped member and a bottom edge of said cover, wherein said hinge will allow said cover to pivot between a first up position and a second down position;
   wherein said holding means comprises a stack of peelable fly paper sitting between said back wall and said bottom wall of said L-shaped member; and
   wherein said stack of peelable fly paper has a cross section which is smoothly and vertically concave along an entire length of said stack of fly paper.

2. The device as recited as in claim 1, wherein said mounting means comprises at least one pressure sensitive adhesive pad located between said back wall of said L-shaped member and the window pane when the device is mounted on an inside lower portion of a window pane adjacent to a window sill.

3. The device as recited in claim 1, wherein when said cover is in the first up position at a sixty degree angle with respect to said back wall of said L-shaped member, said cover will conceal the flies on said stack of fly paper, while a small space between a top edge of said cover and a top end of said back wall of said L-shaped member will allow other flies to drop down onto said stack of fly paper, and when said cover is in the second down position the flies stuck on said stack of fly paper can be checked, in which a top layer of said stack of fly paper can be removed when needed.

* * * * *